UNITED STATES PATENT OFFICE.

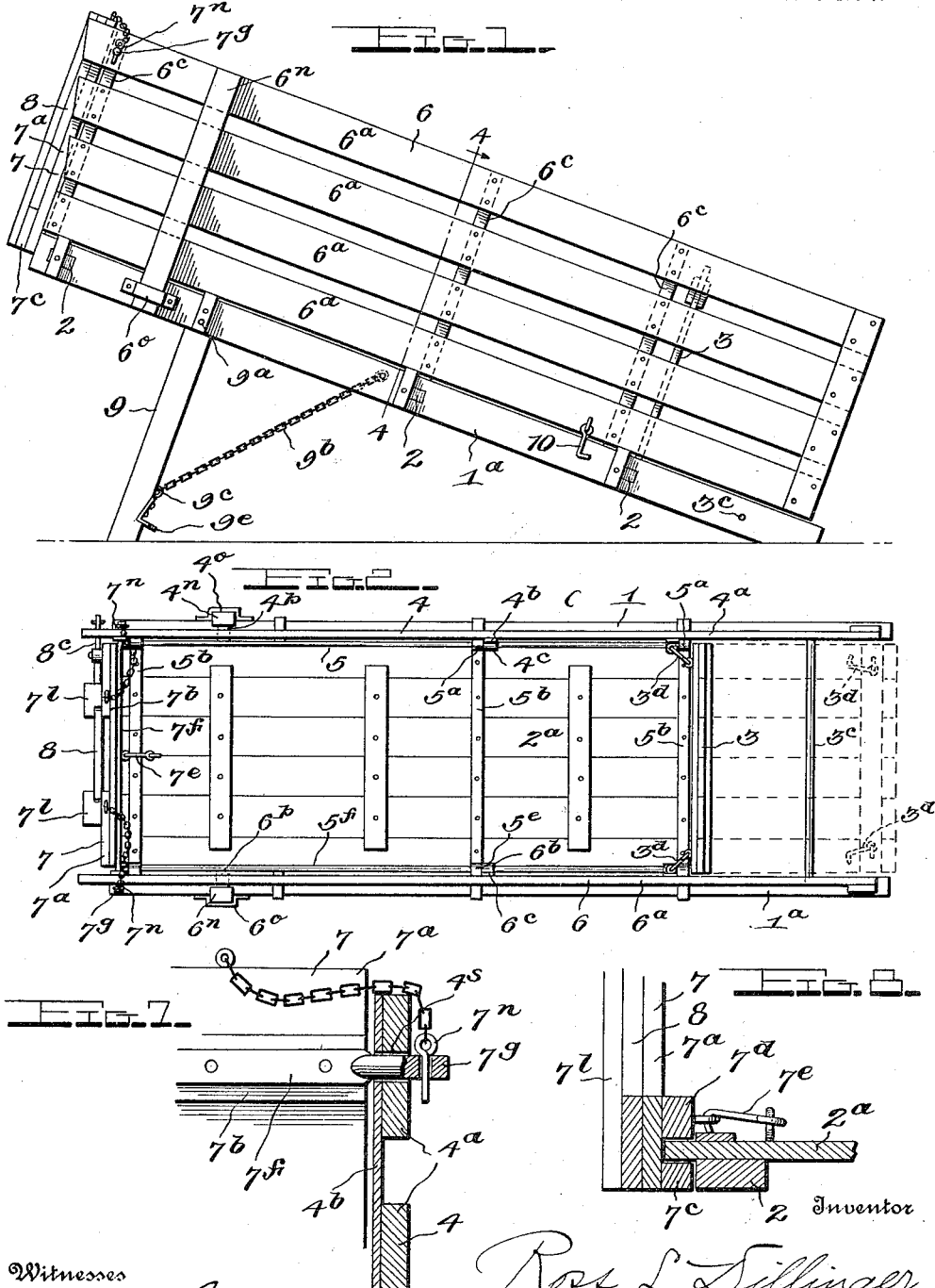

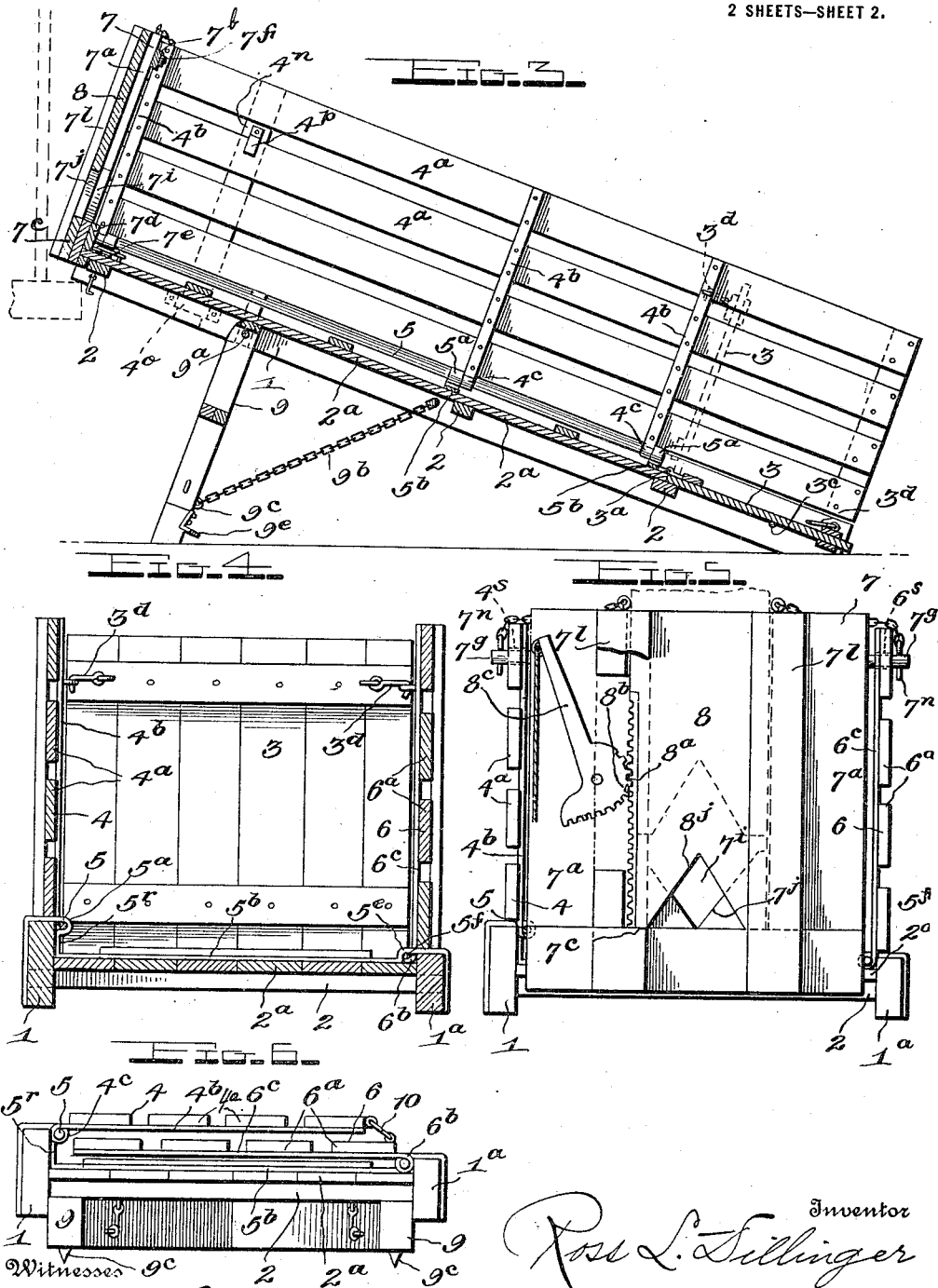

ROSS L. DILLINGER, OF DECATUR, ILLINOIS.

FOLDING STOCK CHUTE-LOADER AND HOG-HOLDER.

1,139,755. Specification of Letters Patent. Patented May 18, 1915.

Application filed February 3, 1914. Serial No. 816,216.

*To all whom it may concern:*

Be it known that I, Ross L. DILLINGER, a citizen of the United States, residing at Decatur, in the county of Macon and State of Illinois, have invented certain new and useful Improvements in Folding Stock Chute-Loaders and Hog-Holders; and I hereby declare that the following is a full, clear, and exact description thereof, reference being had to the accompanying drawings, which form part of this specification.

This invention is an improvement in foldable stock loaders or chutes; its object being to provide a chute which can be used for loading stock in wagons or cars, and for segregating animals in a flock for the purpose of marking same, or to hold the animals singly while being marked; and to enable stock to be accurately counted if desired by compelling them to pass singly therefrom. My chute embodies these improvements, and can be folded in small compass when not in use; can be readily transported from place to place; and when in use can be so adjusted that the stock cannot return but must pass on through the chute in the desired direction.

The invention consists in the novel construction and combination of parts of the chute as set forth in the claims and hereinafter more fully explained with reference to the accompanying drawings in which—

Figure 1 is a side elevation of the chute in one position for use. Fig. 2 is a top plan view of the chute with both the end gates in raised or closed position. Fig. 3 is a longitudinal sectional elevation, showing the hinged lower gate in lowered position in full lines and in raised position by dotted lines. Fig. 4 is a transverse section on line 4—4, Fig. 1. Fig. 5 is an enlarged detail end view, partly broken, showing the hog holding gate. Fig. 6 is an end elevation showing the sides folded. Fig. 7 is a detail. Fig. 8 is a detail.

As shown, the chute comprises two main side bars 1, 1ª, which are preferably connected by transverse bars 2 on which the floor 2ª is supported, the side bars extending beyond the floor 2ª at the lower end of the chute, and the bar 1 projects above the upper surface of the floor 2ª for a purpose hereinafter explained.

To the lower end of the floor 2ª is attached a hinged floor section or gate 3, by suitable hinges 3ª so that said section can be lowered to the position shown in Fig. 3 and form part of the floor-way of the chute; or it can also be raised to the position shown in Figs. 1 and 4 to close the lower end of the chute. When the gate 3 is lowered it can be supported on a rod 3ᶜ between the bars 1, 1ª, and when it is raised it can be fastened by hooks and eyes as shown at 3ᵈ.

To or above the bar 1 is hinged a foldable side 4 which may be composed of one or more longitudinally disposed bars 4ª connected preferably by metallic straps 4ᵇ, the lower ends of which are bent into eyes 4ᶜ and engaged with a rod 5 which is passed through eyes 5ª on transverse straps 5ᵇ extending across the upper surface of the floor 2ª; the opposite ends of said straps 5ᵇ being upturned as shown at 5ʳ beside the projecting upper edge of the side piece 1ª and provided with eyes 5ᵉ transfixed by a rod 5ᶠ which is engaged by the eyes 6ᵇ of straps 6ᶜ to which are connected longitudinal bars 6ª that form the opposite foldable side member 6 of the chute or loader.

The construction is such that the side 6 may be folded inward flat upon the floor 2ª of the chute, and when so folded (see Fig. 6) will practically lie below the upper edge of the side bar 1; and the side 4 can then be turned down over the side 6 as shown in Fig. 6 thus folding the chute compactly. When the chute is to be folded the gate section 3 is lowered into alinement with the floor, as shown in Fig. 3 and in dotted lines, Fig. 2.

The gate section 3 may be fastened in raised position as indicated in Figs. 2 and 4, after stock has been driven into the chute so that the stock cannot come back but must go forward through the chute into the car or wagon. The sides 4 and 6 fold inwardly, but when raised their lower edges abut against the upper edges of the side members 1 and 1ª respectively, so that the sides cannot fall outwardly and are held in upright position. The sides 4 and 6 may be braced when raised by means of standards 4ⁿ and 6ⁿ which are adapted to be engaged with loops 4º and 6º attached to the outer sides of the bars 1, 1ª, preferably near the upper end of the chute, and these standards are provided near their upper ends with bayonet-hook-members 4ᵖ and 6ᵖ which are adapted to be engaged over one of the side bars 5ᵃ and 6ᵃ as indicated in Fig. 3 and thus hold the frames securely in upright position.

When loading small stock it is desirable to provide for the passage of the stock from the chute singly so as to enable them to be counted as they leave the chute, and for this purpose I provide a removable gate 7 for the upper end of the chute which gate may be formed of vertical wooden bars 7ᵃ connected by top and bottom wooden bars 7ᵇ, 7ᶜ; at the inner side and above the bar 7ᶜ may be a cross-bar 7ᵈ which is adapted to rest upon the upper edge of the floor of the chute as shown in Fig. 8 and thus support the gate thereupon while the bar 7ᶜ underlies the lower edge of the floor and thus prevents vertical lifting of this gate by the stock. The lower edge of gate 7 may be held in place by means of hooks 7ᵉ, and the upper end may be held in place by means of a rod 7ᶠ attached to the bar 7ᵇ and projecting beyond the sides of the gate. The ends 7ᵍ of this bar are adapted to pass through apertures 4ˢ and 6ˢ in the upper ends of the adjacent side members 4 and 6. as shown in Figs. 5 and 7, and may be retained by keys 7ʰ, so that when this gate 7 is in place it holds the sides firmly together. The gate 7 is provided with a central passage or opening 7ⁱ which preferably has a V-shaped lower end 7ʲ, and this passage is adapted to be closed by a vertically movable slide 8 which may be guided in grooved bars 7ˡ attached to the outer side of the gate; this slide may be raised and lowered by any suitable means; preferably I provide one edge of the slide 8 with a rack 8ᵃ which is adapted to be engaged by a segment 8ᵇ pivoted to the gate 7 and provided with a handle 8ᶜ by which it can be operated, as indicated in Fig. 5. When small stock is being loaded this slide may be adjusted so as to allow only one animal at a time to pass from the chute or loader, so that they can be accurately counted as they pass, and should it be desired to mark the animals the slide 8 may be operated so that when an animal starts to pass through the opening the slide is dropped so as to catch the animal by the throat in the V-shaped notch 8ʲ in the bottom of the slide corresponding to the V-shaped notch 7ʲ at the lower end of the passage. The animal can thus be securely held without injury and can be marked while so held; by this means the animals can be held effectively while being marked or ringed.

A foldable leg member 9 of any suitable construction is hinged to and between the sides 1, 1ᵃ, near the upper end of the chute by means of a rod 9ᵃ transfixing the side bars, and the leg, as indicated in Fig. 1. When the leg 9 is lowered as indicated in Fig. 1 it may be held in such position by any suitable devices, chains 9ᵇ being shown as attached to the bars 1, 1ᵃ, and provided with hooks adapted to engage eyes 9ᶜ on the leg. This leg may be folded up against the bottom of the chute as indicated in Fig. 6 and when so folded the ends project slightly beyond the end of the chute and are provided with spuds or hook members 9ᵉ which are adapted to engage the sill of the car, or wagon, and hold the chute firmly thereto. The chute when folded can easily be slid along the ground, and can be folded for transportation, or when not in use. When folded the sides may be fastened by a hook and eye as indicated at 10 in Fig. 6.

It will be observed that in this invention the chute floor is composed of two sections, one of which operates as a floor in one position and as a gate in another position, the chute being shortened when the gate is closed and facilitates loading stock therefrom. When loading large stock the gate 7 may be removed.

What I claim is:

1. A foldable stock chute, comprising opposite side bars, opposite foldable side members hingedly connected with said side bars, a floor secured between said bars and shorter than said bars and side members, and a combined gate and floor member hingedly connected at the inner end of the said floor section and adapted when lowered to form part of the floor, and when raised to close the lower part of the chute; said side members being foldable one over the other and over both the floor and floor member when the latter is lowered, substantially as described.

2. A foldable stock chute comprising opposite side bars, one of said bars projecting above the floor, opposite side members hinged to said side bars in such manner as to fold inwardly over the floor and one over the other, and when raised to stand above said bars, a floor fixedly connected to said bars and shorter than said bars and side members, and a combined gate and floor member hingedly connected to the inner end of the floor and adapted when in lowered position to form part of the floor, and when in raised position to stand between the sides, and means for securing said member in raised position, substantially as described.

3. A foldable stock chute comprising opposite side bars, one of said bars projecting above the floor, opposite side members hinged to said side bars in such manner as to fold inwardly over the floor and one over the other, and when raised to stand above and upon the upper edges of said bars thereby preventing their dropping outwardly; a floor fixedly connected to but shorter than said bars and side members, an adjustable member hingedly connected to the lower end of the floor, and adapted when lowered to form part of the floor, and when raised to stand as a gate between the sides; with a gate removably attached to the upper end of the chute and provided with a stock passage, and a slide for closing or regulating the size of said passage, substantially as described.

4. The herein described stock chute comprising opposite side bars, a floor connected with but shorter than said bars, metal straps extending across the floor having eyes on their ends, side members provided with hinge pieces, and rods transfixing the eyes on said straps and said hinge pieces to hingedly connect the said members to the respective bars, whereby the side members can fold inwardly one over the other but are prevented from swinging outwardly; a floor and gate member hingedly connected to one end of the floor and adapted to lie between the side bars and form part of the floor when in lowered position and to form a gate when in raised position, and means for fastening this member in raised position, substantially as described.

5. In combination with a stock loader or chute, having bottom and side members, of a gate member detachably attached to the upper end of said chute and having a vertical opening or slot provided with a V-shaped lower end, a slide for closing said slot, guides for said slide attached to the gate, means to operate the slide, and a rod attached to the upper end of said gate projecting beyond the edges thereof adapted to engage corresponding apertures in the sides of the chute to fasten the gate in place and means adapted to engage said rod to hold the sides together.

6. In combination with a stock loader or chute, having bottom and side members, of a gate member detachably attached to the upper end of said chute and having a vertical opening or slot, a slide for closing said slot, guides for said slide attached to the gate, a rack on the side of said slide, a segment pivoted on the gate and engaging said rack to operate the slide, and a rod attached to the upper end of said gate projecting beyond the edges thereof adapted to engage corresponding apertures in the sides of the chute to fasten the gate in place and means adapted to engage said rod to hold the sides together.

In testimony that I claim the foregoing as my own, I affix my signature in presence of two witnesses.

ROSS L. DILLINGER.

Witnesses:
ELIJAH M. NEELLEY,
C. E. MILNES.

Copies of this patent may be obtained for five cents each, by addressing the "Commissioner of Patents, Washington, D. C."